United States Patent
Goldenberg et al.

(10) Patent No.: US 12,328,505 B2
(45) Date of Patent: Jun. 10, 2025

(54) SLIM COMPACT LENS OPTICAL IMAGE STABILIZATION

(71) Applicant: Corephotonics Ltd., Tel Aviv (IL)

(72) Inventors: Ephraim Goldenberg, Tel Aviv (IL); Kobi Goldstein, Tel Aviv (IL); Yiftah Kowal, Tel Aviv (IL); Vinay Bhus, Tel Aviv (IL); Oriel Grushka, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/847,256

(22) PCT Filed: Mar. 14, 2023

(86) PCT No.: PCT/IB2023/052461
§ 371 (c)(1),
(2) Date: Sep. 15, 2024

(87) PCT Pub. No.: WO2023/180871
PCT Pub. Date: Sep. 28, 2023

(65) Prior Publication Data
US 2025/0113105 A1    Apr. 3, 2025

Related U.S. Application Data

(60) Provisional application No. 63/408,642, filed on Sep. 21, 2022, provisional application No. 63/327,954, (Continued)

(51) Int. Cl.
*H04N 23/68* (2023.01)
*G03B 5/04* (2021.01)
*G03B 30/00* (2021.01)

(52) U.S. Cl.
CPC ............. *H04N 23/687* (2023.01); *G03B 5/04* (2013.01); *G03B 30/00* (2021.01); *G03B 2205/0015* (2013.01)

(58) Field of Classification Search
CPC ........ H04N 23/687; G03B 5/04; G03B 30/00; G03B 2205/0015
See application file for complete search history.

(56) References Cited

U.S. PATENT DOCUMENTS 3,085,354 A    4/1963    Rasmussen et al.
3,584,513 A    6/1971    Gates
(Continued)

FOREIGN PATENT DOCUMENTS

CN    101276415 A    10/2008
CN    201514511 U    6/2010
(Continued)

OTHER PUBLICATIONS

International Search Report and Written Opinion in related PCT application PCT/IB2023/052461, dated Aug. 10, 2023.
Statistical Modeling and Performance Characterization of a Real-Time Dual Camera Surveillance System, Greienhagen et al., Publisher: IEEE, 2000, 8 pages.
(Continued)

*Primary Examiner* — Padma Haliyur
(74) *Attorney, Agent, or Firm* — Nathan & Associates; Menachem Nathan

(57) ABSTRACT

Optical image stabilization (OIS) mechanisms, comprising a moving frame including a first groove, a static frame including a second groove, an OIS actuator, and first, second and third bearings that define an OIS plane, wherein the first ball bearing is located in a rail formed by the first groove and the second groove, wherein the ball-bearings are positioned between the moving frame and the static frame and allow a first movement and a second movement of the moving frame relative to the static frame, wherein the first movement is a rotational movement performed around a rotation axis that coincides with the position of the first ball bearing and is perpendicular to the OIS plane, and wherein the second movement is a linear movement along the rail.

19 Claims, 7 Drawing Sheets

Related U.S. Application Data filed on Apr. 6, 2022, provisional application No. 63/323,271, filed on Mar. 24, 2022.

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,320,610 B1 | 11/2001 | Gant et al. |
| 6,341,901 B1 | 1/2002 | Iwasa et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,304,305 B1 | 4/2016 | Paul et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0169772 A1 | 9/2004 | Matsui et al. |
| 2004/0189849 A1 | 9/2004 | Hofer et al. |
| 2004/0227838 A1 | 11/2004 | Atarashi et al. |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |

(56) References Cited

U.S. PATENT DOCUMENTS

| | | |
|---|---|---|
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0035631 A1 | 2/2007 | Ueda |
| 2007/0077057 A1 | 4/2007 | Chang |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0190909 A1 | 7/2009 | Mise et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2011/0310219 A1 | 12/2011 | Kim et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0098927 A1 | 4/2012 | Sablak et al. |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-Lacroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |

(56) References Cited

U.S. PATENT DOCUMENTS

| | | |
|---|---|---|
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0181115 A1 | 6/2015 | Mashiah |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0288865 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0028949 A1 | 1/2016 | Lee et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0245669 A1 | 8/2016 | Nomura |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0115466 A1 | 4/2017 | Murakami et al. |
| 2017/0124987 A1 | 5/2017 | Kim et al. |
| 2017/0150061 A1 | 5/2017 | Shabtay et al. |
| 2017/0176711 A1 | 6/2017 | Iwasaki et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0230552 A1 | 8/2017 | Eromaki et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2017/0294002 A1 | 10/2017 | Jia et al. |
| 2017/0329111 A1 | 11/2017 | Hu et al. |
| 2017/0363882 A1* | 12/2017 | Konishi ............... G02B 27/646 |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024329 A1* | 1/2018 | Goldenberg ......... G02B 27/646 |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0183982 A1 | 6/2018 | Lee et al. |
| 2018/0184010 A1 | 6/2018 | Cohen et al. |
| 2018/0198897 A1 | 7/2018 | Tang et al. |
| 2018/0216925 A1 | 8/2018 | Yasuda et al. |
| 2018/0239161 A1* | 8/2018 | Seol ..................... G02B 27/646 |
| 2018/0241922 A1 | 8/2018 | Baldwin et al. |
| 2018/0249090 A1 | 8/2018 | Nakagawa et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0368656 A1 | 12/2018 | Austin et al. |
| 2019/0089941 A1 | 3/2019 | Bigioi et al. |
| 2019/0096047 A1 | 3/2019 | Ogasawara |
| 2019/0100156 A1 | 4/2019 | Chung et al. |
| 2019/0104258 A1* | 4/2019 | Cohen ................... H04N 23/75 |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0154466 A1 | 5/2019 | Fletcher |
| 2019/0187486 A1* | 6/2019 | Goldenberg ............. G02B 7/04 |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0227338 A1 | 7/2019 | Bachar et al. |
| 2019/0228562 A1 | 7/2019 | Song |
| 2019/0297238 A1 | 9/2019 | Klosterman |
| 2019/0320119 A1 | 10/2019 | Miyoshi |
| 2019/0377155 A1 | 12/2019 | Bachar et al. |
| 2020/0014912 A1 | 1/2020 | Kytsun et al. |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0118287 A1 | 4/2020 | Hsieh et al. |
| 2020/0134848 A1 | 4/2020 | El-Khamy et al. |
| 2020/0162682 A1 | 5/2020 | Cheng et al. |
| 2020/0220956 A1 | 7/2020 | Fujisaki et al. |
| 2020/0221026 A1 | 7/2020 | Fridman et al. |
| 2020/0264403 A1 | 8/2020 | Bachar et al. |
| 2020/0314224 A1 | 10/2020 | Yang |
| 2020/0389580 A1 | 12/2020 | Kodama et al. |
| 2021/0003842 A1 | 1/2021 | Gross |
| 2021/0180989 A1 | 6/2021 | Fukumura et al. |
| 2021/0208415 A1 | 7/2021 | Goldenberg et al. |
| 2021/0333521 A9 | 10/2021 | Yedid et al. |
| 2021/0368104 A1 | 11/2021 | Bian et al. |
| 2022/0003957 A1 | 1/2022 | Brown et al. |
| 2022/0146910 A1 | 5/2022 | Li et al. |
| 2022/0252963 A1 | 8/2022 | Shabtay et al. |
| 2022/0368814 A1 | 11/2022 | Topliss et al. |
| 2023/0022701 A1 | 1/2023 | Li et al. |

FOREIGN PATENT DOCUMENTS

| | | |
|---|---|---|
| CN | 102130567 A | 7/2011 |
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 203482298 U | 3/2014 |
| CN | 103841404 A | 6/2014 |
| CN | 204422947 U | 6/2015 |
| CN | 205301703 U | 6/2016 |
| CN | 105827903 A | 8/2016 |
| CN | 105847662 A | 8/2016 |
| CN | 105872325 A | 8/2016 |
| CN | 107608052 A | 1/2018 |
| CN | 107682489 A | 2/2018 |
| CN | 208060910 | 11/2018 |
| CN | 109729266 A | 5/2019 |
| CN | 111988454 A | 11/2020 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |

(56) References Cited

FOREIGN PATENT DOCUMENTS

| | | | |
|---|---|---|---|
| JP | 2005099265 A | 4/2005 |
| JP | 2005122084 A | 5/2005 |
| JP | 2005321592 A | 11/2005 |
| JP | 2006038891 A | 2/2006 |
| JP | 2006191411 A | 7/2006 |
| JP | 2006237914 A | 9/2006 |
| JP | 2006238325 A | 9/2006 |
| JP | 2008083377 A | 9/2006 |
| JP | 2007086808 A | 4/2007 |
| JP | 2007228006 A | 9/2007 |
| JP | 2007306282 A | 11/2007 |
| JP | 2008076485 A | 4/2008 |
| JP | 2008245142 A | 10/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |
| JP | 2013101213 A | 5/2013 |
| JP | 2013106289 A | 5/2013 |
| JP | 2016105577 A | 6/2016 |
| JP | 2017146440 A | 8/2017 |
| JP | 2018022123 A | 2/2018 |
| JP | 2019126179 A | 7/2019 |
| KR | 20070005946 A | 1/2007 |
| KR | 20090058229 A | 6/2009 |
| KR | 20100008936 A | 1/2010 |
| KR | 20110080590 A | 7/2011 |
| KR | 20110082494 A | 7/2011 |
| KR | 20130104764 A | 9/2013 |
| KR | 1020130135805 A | 11/2013 |
| KR | 20140014787 A | 2/2014 |
| KR | 101428042 B1 | 8/2014 |
| KR | 101477178 B1 | 12/2014 |
| KR | 20140144126 A | 12/2014 |
| KR | 20150118012 A | 10/2015 |
| KR | 20170105236 A | 9/2017 |
| KR | 20180120894 A | 11/2018 |
| KR | 20130085116 A | 6/2019 |
| TW | I407177 B | 9/2013 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11um CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Zitova Bet Al: "Image Registration Methods: A Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: i0_i0i6/ S0262-8856(03)00137-9.
Itay Yedid: "The Evolution of Zoom Camera Technologies in Smartphones", Corephotonics White Paper, Aug. 1, 2017 (Aug. 1, 2017), XP055980796.
George B Arfken: "Mathematical Methods for Physicists: A Comprehensive Guide" In: "Mathematical Methods for Physicists: A Comprehensive Guide", Jan. 1, 2013 (Jan. 1, 2013), Elsevier, XP093159030, ISBN: 978-0-12-384654-9 pp. 195-196.
Office Action in related CN patent application 202380027480.8, dated Feb. 7, 2025.

* cited by examiner

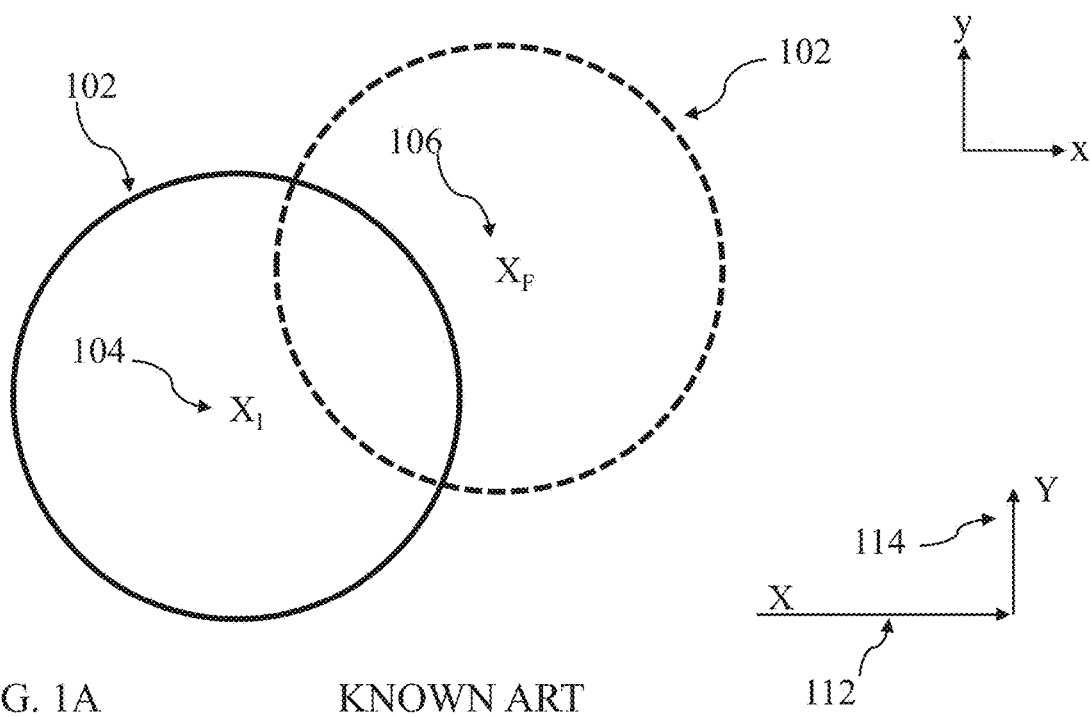
FIG. 1A  KNOWN ART
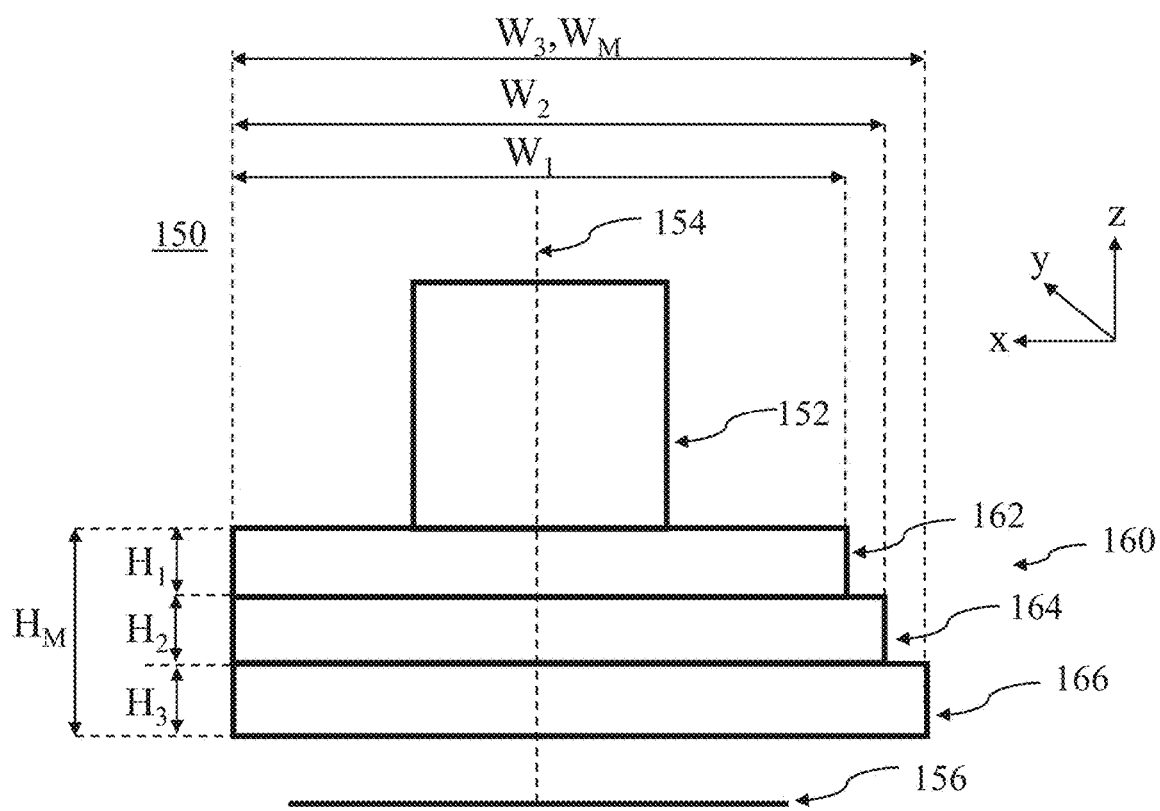
FIG. 1B  KNOWN ART

SLIM COMPACT LENS OPTICAL IMAGE STABILIZATION

CROSS REFERENCE TO RELATED APPLICATION

This application claims the benefit of priority from U.S. provisional patent applications Nos. 63/323,271 filed Mar. 24, 2022, 63/327,954 filed Apr. 6, 2022 and 63/408,642 filed Sep. 21, 2022, all of which are incorporated herein by reference in their entirety.

FIELD

The present disclosure relates in general to digital cameras, and in particular to digital cameras with optical image stabilization (OIS).

BACKGROUND

Camera modules of modern mobile devices such as smartphones and tablet computers typically need to have a low thickness or height, i.e. be "slim" in order to fit into the casing of the mobile devices.

For improving a camera's image quality, modern camera modules usually include OIS. OIS cancels (or reduces) an undesired motion of an image at the image sensor plane during the image sensor's exposure. Without cancellation of the OIS, the undesired motion would cause a blurring of the image. Such undesired motion is for example caused by a user who unintentionally moves or shakes a mobile device during capturing of an image ("hand motion" or "hand-shake").

In most current smartphones, OIS corrects for hand-shake around two of the three rotation axes of the device. Explicitly, OIS corrects for hand-shake around the two rotation axes which are perpendicular to a normal of an image sensor included in the camera, or in other words, perpendicular to lens optical axis of a lens included in the camera. For achieving this, movements of the lens (relative to the image sensor), of the image sensor (relative to the lens), or of the entire camera (relative to the mobile device), are performed linearly in two directions that are perpendicular to the camera optical axis. These movements are performed so that they counteract (or mitigate) a hand-shake, such that an image on the image sensor plane does not (or does only slightly) move with respect to the image sensor, i.e. the image is stabilized. If the lens is moved relative to the image sensor (and relative to the smartphone including the camera), one refers to "lens-shift OIS".

An OIS module (or "OIS assembly") includes all the mechanical components that are required for performing this movement. An OIS module for performing lens-shift OIS is referred to as lens-shift OIS module.

FIG. 1A shows in a top view a schematic of lens-shift OIS module for moving a lens 102 as known in the art. An image sensor (not shown) may be oriented parallel to the shown x-y plane. An optical axis (not shown) of lens 102 is oriented perpendicular to the shown x-y plane. For mitigating a user's hand-shake (i.e. for OIS), lens 102 is moved from an initial position characterized by lens 102's initial center position ("$X_I$") 104 to a final center position ("$X_F$") 106. For performing this movement of lens 102, lens 102 is linearly moved in the x-direction as indicated by arrow 112, and, in addition, lens 102 is linearly moved in the y-direction as indicated by arrow 114. The two movements may be performed simultaneously.

FIG. 1B shows in a side view and schematically a camera 150 that includes a lens 152 having a lens optical axis 154, an image sensor 156 and a lens-shift OIS module 160 as known in the art. Lens-shift OIS module 160 has an OIS module height $H_M$ and an OIS module width $W_M$ and is operational to perform lens-shift OIS as described in FIG. 1A. Lens-shift OIS module 160 includes a first OIS frame 162 having a first OIS frame height ("$H_1$") and a first OIS frame width ("$W_1$"), a second OIS frame 164 having a second OIS frame height ("$H_2$") and a second OIS frame width ("$W_2$") and a third OIS frame 166 having a third OIS frame height ("$H_3$") and a third OIS frame width ("$W_3$"). Here, $H_M=H_1+H_2+H_3$ and $W_M=W_3$. It is noted that a larger number of OIS frames results in a larger module height $H_M$.

In the x-y plane (i.e. radially with respect to optical axis 154), lens 152 does not move relative to first OIS frame 162. Thus, any movement in the x-y plane which is imposed on first OIS frame 162, in particular any movement in the x-y plane for performing OIS, causes the lens to follow the movement of first OIS frame 162. In the z-direction (i.e. axially with respect to optical axis 154), the lens may move with respect to first OIS frame 162 and image sensor 156 for focusing. Third OIS frame 166 is static, meaning it does not move relative to image sensor 156. Image sensor 156 does not move relative to a mobile device including camera 150. $H_1$, $H_2$ and $H_3$ may be in the range of 0.25-2.5 mm. $H_M$ may be in the range 0.5-10 mm. $W_1$, $W_2$ and $W_3$ may be in the range 5-50 mm. In particular, $W_{i+1}=W_i+0.5\text{-}5$ mm (where i=1, 2, 3, etc.), i.e. given a same $W_1$, a larger number of OIS frames results in a larger module width $W_M$.

Lens-shift OIS in a first direction perpendicular to optical axis 154 is performed by (1) linearly moving second OIS frame 164 with respect to third OIS frame 166 in a first direction, while (2) not moving first OIS frame 162 relative to second OIS frame 164. In other words, for lens-shift OIS in the first direction, first OIS frame 162 "rides" on (or is carried by) second OIS frame 164. Since lens 152 does not move relative to first OIS frame 162 in the x-y plane, this leads to a linear movement of lens 152 in the first direction. Lens-shift OIS in a second direction perpendicular to both the first direction and to the optical axis 154 is performed by (1) linearly moving first OIS frame 162 with respect to second OIS frame 164 in the second direction while (2) not moving second OIS frame 164 relative to third OIS frame 166. This leads to a linear movement of lens 152 in the second direction.

In some examples, e.g. such as shown in co-owned international patent application PCT/IB2022/052194, which is incorporated herein by reference in its entirety, actuation for lens-shift OIS in a first direction is transmitted by a "ball-bearing" mechanism as known in the art. For transmitting this actuation, one or more balls of the ball-bearings are enclosed in and move in a linear rail formed in an interspace by two grooves, each groove being included in a different component (or part). An example of a ball-bearing mechanism is pin-groove mechanism 310 (FIG. 3B).

OIS actuation may for example be provided by a voice coil motor (VCM). For transmitting actuation for lens-shift OIS in the first direction, second OIS frame 164 includes one or more grooves that are oriented parallel to the first direction, and third OIS frame 166 includes one or more grooves that face the one or more grooves included in second OIS frame 164. One or more moving balls are enclosed (or confined) in one or more rails formed by the grooves included in second OIS frame 164 and in third OIS frame 166. Transmission of an actuation for lens-shift OIS in the second direction may be performed in a same manner.

The motion required for OIS in the x-y plane is fully defined within a certain OIS range, i.e. within the OIS range lens 152 can be moved from any $X_I$ to any $X_F$, given that $X_I$ and $X_F$ are included in the OIS range. We note that lens-shift OIS in the first linear direction and lens-shift OIS in the second linear direction cannot be transmitted using two OIS frames only. Therefore, three OIS frames are used, which add additional height and width (i.e. cause a height and width "penalty").

A slim and compact lens-shift OIS module, i.e. an OIS lens-shift module having a low $H_M$ and a low $W_M$ is beneficial for achieving a slim and compact camera module. Therefore, there is need and it would be beneficial to have a slim and compact OIS module.

SUMMARY

In various exemplary embodiments, there are provided OIS mechanisms comprising a moving frame including a first groove; a static frame including a second groove; an OIS actuator; and first, second and third ball-bearings defining an OIS plane and positioned between the moving frame and the static frame to allow a first movement and a second movement of the moving frame relative to the static frame, wherein the first ball bearing is located in a rail formed by the first groove and the second groove, wherein the first movement is a rotational movement of the moving frame around a rotation axis that coincides with the position of the first ball bearing and is perpendicular to the OIS plane, and wherein the second movement is a linear movement of the moving frame along the rail.

In some examples, the moving frame includes a first pool and a third pool, wherein the static frame includes a second pool and a fourth pool, wherein the second ball bearing is located in a volume formed by the first pool the second pool, and wherein the third ball bearing is located in a volume formed by the third pool and the fourth pool.

In some examples, the OIS mechanism is operational to provide OIS along two OIS directions.

In some examples, the OIS actuator is a regular voice coil motor (VCM). In some examples, the regular VCM includes at least one magnet fixedly coupled to the static frame. In some examples, the regular VCM includes at least one magnet fixedly coupled to the moving frame.

In some examples, the OIS actuator is a push-pull VCM. In some examples, the push-pull VCM includes at least one magnet fixedly coupled to the static frame. In some examples, the push-pull VCM includes at least one magnet fixedly coupled to the moving frame.

In some examples, the OIS mechanism is operational to provide OIS in an OIS range of less than 2 mm in the direction of the first movement and less than 2 mm in the direction of the second movement.

In some examples, the moving frame has a moving frame height $H_{MF}$ and the static frame has a static frame height $H_{SF}$, wherein $H_{MF}$ is in the range of 0.25 mm to 1.5 mm and wherein $H_{SF}$ is in the range of 0.25 mm to 1.5 mm.

In some examples, the moving frame has a moving frame width $W_{MF}$ and the static frame has a static frame width $W_{SF}$, wherein $W_{MF}$ is in the range of 10 mm to 40 mm and wherein $W_{SF}$ is in the range of 10 mm to 40 mm.

In some examples, the OIS mechanism is included in an OIS module, and wherein the OIS module has an OIS module height $H_M$ in the range of 0.5 mm to 5 mm.

In some examples, the OIS mechanism is included in an OIS module, and wherein the OIS module has an OIS module width $W_M$ in the range of 10 mm to 40 mm.

In some examples, an OIS mechanism is included in a digital camera that comprises a lens, and the lens moves together with the moving frame for the OIS. In some examples, the lens moves relative to the moving frame for focusing. In some examples, the digital camera includes an image sensor and the position of the first ball bearing is located at a center position of the image sensor. In some examples, the digital camera is a pop-out camera. In some examples, the digital camera is included in a smartphone.

In various exemplary embodiments, there is provided, in a mobile device comprising a digital camera that includes a lens and an image sensor, a method comprising: providing in the digital camera a lens-shift OIS module that includes only a first, moving frame, and a second, static frame; and actuating the moving frame to move the lens relative to the image sensor in a first, rotational movement, and in a second, linear movement to provide OIS, wherein the lens has an effective focal length (EFL) in the range of 2.5 mm to 50 mm.

BRIEF DESCRIPTION OF THE DRAWINGS

FIG. 1A shows in a top view a schematic of a known art lens-shift OIS (optical image stabilization) moving a lens;

FIG. 1B shows in a side view and schematically a camera that includes a lens having a, an image sensor and a lens-shift OIS module as known in the art;

DETAILED DESCRIPTION

Figure 2A:
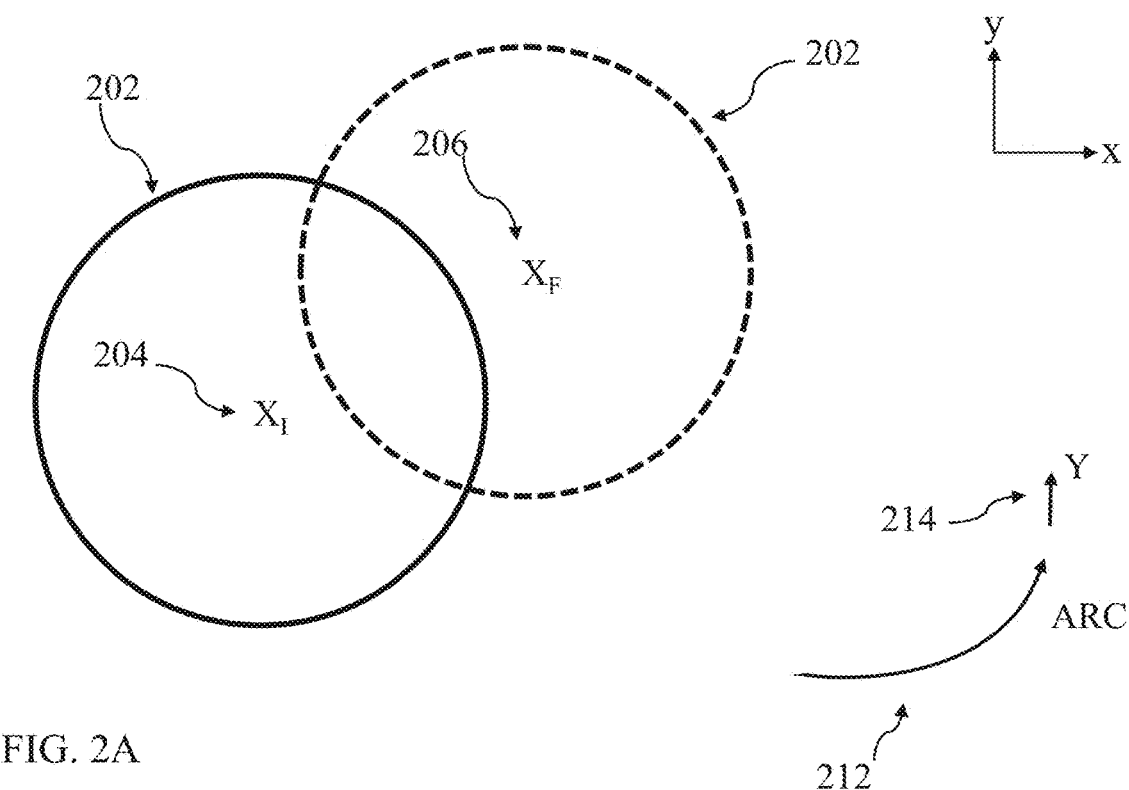
FIG. 2A shows a schematic of a lens-shift OIS moving a lens as disclosed herein in a top view.

FIG. 2A shows a schematic of a lens-shift OIS moving a lens 202 as disclosed herein in a top view. An image sensor (not shown) may be oriented parallel to the shown x-y plane. An optical axis (not shown) of lens 202 is oriented perpendicular to the shown x-y plane. For OIS, lens 202 is moved from an initial position characterized by lens 202's initial center position ("$X_I$") 204 to its final center position ("$X_F$") 206. For performing that movement of lens 202, lens 202 may be rotationally moved around an axis (FIGS. 3A-B) substantially parallel to the optical axis of lens 202 and as indicated by an arc 212, and, in addition, lens 202 may be linearly moved in the y-direction as indicated by an arrow 214.

Figure 2B:
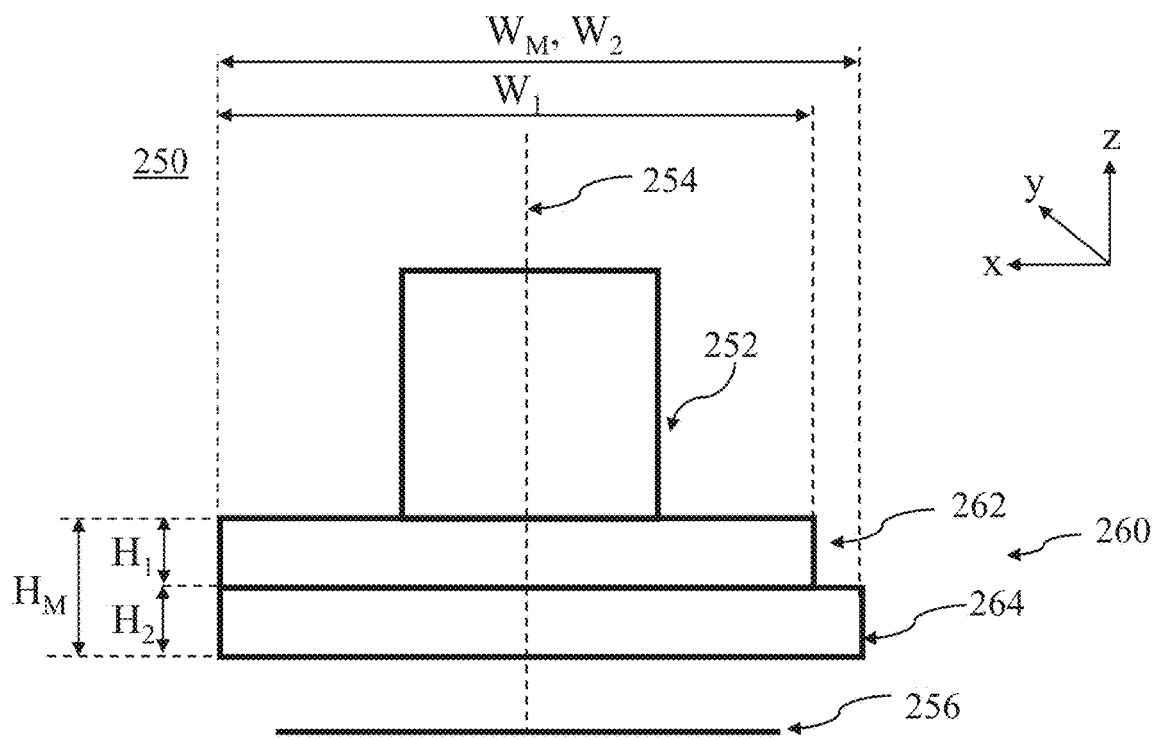
FIG. 2B shows schematically a camera including a lens, an image sensor and a lens-shift OIS module as disclosed herein in a side view.

FIG. 2B shows schematically an embodiment of a camera numbered 250 that includes a lens 252 having a lens optical axis 254, an image sensor 256 and a lens-shift OIS module 260 as disclosed herein in a side view. Lens-shift OIS module 260 has an OIS module height $H_M$, an OIS module width $W_M$ and is operational to perform lens-shift OIS as described in FIG. 2A. Lens-shift OIS module 260 includes a first OIS frame 262 having a first OIS frame height $H_1$ and a first OIS frame width $W_1$ and a second OIS frame 264 having a second OIS frame height $H_2$ and a second OIS frame width $W_2$. Here, $H_M=H_1+H_2$ and $W_M=W_2$. In comparison with known OIS module 160, in OIS module 260 there is no need for a third OIS frame, and therefore an additional height penalty and width penalty associated with a third OIS frame is avoided. This allows a slim and compact OIS module, i.e. an OIS module having a low $H_M$ and a small $W_M$, which is beneficial for use in a camera included in a mobile device such as a smartphone. To clarify, all embodiments disclosed herein are beneficial for use in a camera included in a mobile device such as a smartphone. The camera may include a lens having a lens optical axis, an effective focal length ("EFL") in the range of 2.5 mm-50 mm, and preferably in the range of 5 mm-20 mm. The camera may as well include an image sensor having an image sensor diagonal ("SD") in the range of in the range of 5 mm-30 mm, and preferably in the range of 7.5 mm-25 mm. In some examples, such a camera may be a sub-camera which, together with other sub-cameras forms a multi-camera (such as a dual-camera) of a mobile device, as known in the art.

In the x-y plane, lens 252 does not move relative to first OIS frame 262. Thus, any movement in the x-y plane imposed on first OIS frame 262, in particular any movement in the x-y plane for performing OIS, causes lens 252 to follow the movement of first OIS frame 262. Therefore, first OIS frame 262 is also referred to as "moving frame". In the z-direction, lens 252 may move with respect to first OIS frame 262 and image sensor 256 for focusing. Second OIS frame 264 is static and does not move relative to image sensor 256. Therefore, second OIS frame 264 is also referred to as "static frame". Image sensor 256 does not move relative to a mobile device including camera 250. This is valid for all embodiments disclosed herein. In the following and when referring to an OIS component that does not move (or is static) relative to a mobile device including an OIS mechanism disclosed herein, we state that "the OIS component does not move with respect to the image sensor". $W_M$ is determined by $W_2$, i.e. $W_M=W_2$. In particular, $W_{i+1}=W_i+0.5$-5 mm, i.e. given a same $W_1$, a smaller number of OIS frames results in a smaller module width $W_M$, which is beneficial for use in a camera included in a mobile device such as a smartphone. In some embodiments, lens-shift OIS modules disclosed herein may be beneficial for use in a "pop-out camera", such as e.g. disclosed in the international patent application PCT/IB2020/058697, which is incorporated herein by reference in its entirety.

Lens-shift OIS in the x-y plane, i.e. perpendicular to the optical axis 254, is performed by (1) rotationally moving first OIS frame 262 with respect to second OIS frame 264 in a rotation direction as indicated by arc 212 while (2) in addition linearly moving first OIS frame 262 relative to second OIS frame 264 as indicated by arrow 214. Since lens 252 does not move relative to first OIS frame 262 in the x-y plane, this leads to a superposition of a rotational and a linear movement of lens 252 in the x-y plane. It is noted that these two movements can be performed sequentially or simultaneously. An example for actuation and transmission of this actuation for lens-shift OIS is described in FIGS. 3A-C, FIGS. 4A-B and FIGS. 5A-B.

The motion required for OIS within a certain OIS range in the x-y plane is fully defined, i.e. within the OIS range lens 252 can be moved from any $X_I$ to any $X_F$, given that $X_I$ and $X_F$ are included in the OIS range. We note that lens-shift OIS in the entire OIS range in the x-y plane can be performed using two OIS frames. Therefore, a height and width penalty associated with a third OIS frames is prevented. Typically, an OIS range covers an area of less than 10 mm×10 mm. Often, it may cover an area of less than 2 mm×2 mm or even less than 1 mm×1 mm.

Figure 3A:
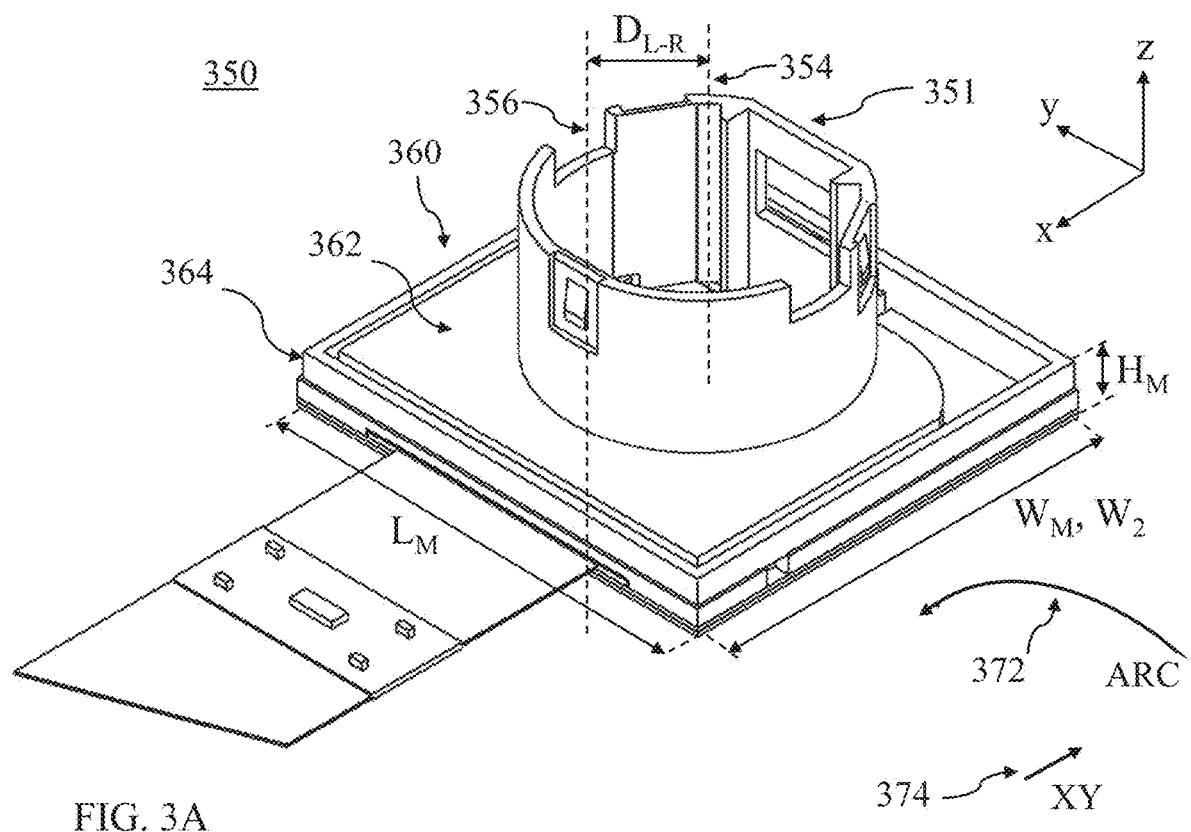
FIG. 3A shows parts of a camera module that includes a lens-shift OIS module as disclosed herein in a perspective view.

FIG. 3A shows parts of an embodiment of a camera module numbered 350 which includes a lens-shift OIS module 360 as disclosed herein in a perspective view. An image sensor (not visible) may be oriented parallel to the shown x-y plane. Camera module 350 includes a lens carrier 351 that includes a lens (not shown) having a lens optical axis 354. Lens optical axis 354 is oriented perpendicular to the x-y plane, i.e. parallel to the z-axis. In the x-y plane, the lens does not move relative to lens carrier 351, so that an x-y movement imposed on lens carrier 351 causes the lens to follow the movement of lens carrier 351. In particular, any movement imposed on lens carrier 351 for OIS is performed also by the lens.

Lens-shift OIS module 360 has an OIS module height $H_M$, an OIS module width $W_M$ and an OIS module length $L_M$. Lens-shift OIS module 360 includes a first OIS frame 362 having a first OIS frame height ($H_1$, see FIG. 3C) and a first OIS frame width ($W_1$, see FIG. 3C) and a second OIS frame 364 having a second OIS frame height ($H_2$, see FIG. 3C) and a second OIS frame width ($W_2$, see FIG. 3C). $H_1$ and $H_2$ may be in the range $H_1, H_2,=0.1$-5 mm, preferably $H_1$ and $H_2$ may be in the range $H_1, H_2=0.25$-1.5 mm. $H_M$ is determined by $H_1$ and $H_2$, i.e. $H_M=H_1+H_2$. $H_M$ may be in the range $H_M=0.25$-10 mm, preferably $H_M$ may be in the range $H_M=0.5$-5 mm. $W_M$ and $L_M$ are to a large extent defined by a size, i.e. a width and a height (such as $H_S$), of image sensor 358. $L_M=W_M±50\%$. $W_1$ and $W_2$ may be in the range $W_1, W_2=5$-75 mm, preferably $W_1$ and $W_2$ may be in the range $W_1, W_2=10$-40 mm. $W_M$ is determined by $W_2$, i.e. $W_M=W_2$. In particular, $W_2=W_1+0.5$-5 mm, i.e. given a same $W_1$, a smaller number of OIS frames results in a smaller module width $W_M$, which is beneficial for use in a camera included in a mobile device such as a smartphone. External dimensions of OIS module 360 in the x-y plane may be such that OIS module 360 may fit in a circle (i.e. may be encircled by a circle) having a diameter between 5 and 75 mm. Lens-shift OIS module 360 includes a linear pin-groove mechanism 310, a first pin-pool mechanism 320, a second pin-pool mechanism 330, a first OIS VCM and a second OIS VCM as described below. The first OIS VCM and the second OIS VCM act as OIS actuator, i.e. the role (or function) of the first OIS VCM and the second OIS VCM in lens-shift OIS module 360 is to actuate an OIS motion in two directions. For two-directional (or two-dimensional) OIS motion, the first OIS VCM actuates an OIS motion in a first direction and the second OIS VCM actuates an OIS motion in a second direction. The role of linear pin-groove mechanism 310, first pin-pool mechanism 320 and second pin-pool mechanism 330 is to transmit and direct the OIS motion.

Lens carrier 351 is fixedly coupled to first OIS frame 362. First OIS frame 362 is a moving frame. Second OIS frame 364 is a static frame and does not move relative to image sensor 358 (see FIG. 3B). For OIS, first OIS frame 362 is rotationally moved relative to second OIS frame 364 as indicated by arc 372. The rotational movement is around a rotation axis 356 which is substantially parallel to the lens optical axis 354. A distance between lens optical axis 354 and rotation axis 356 is marked "$D_{L-R}$". $D_{L-R}$ may be in the range of $D_{L-R}=\frac{1}{2} H_S+0$ mm-10 mm, wherein $H_S$ is a height of image sensor 358. There is a trade-off for a size of $D_{L-R}$: A large $D_{L-R}$ is beneficial for performing a rotational movement having a large radius of curvature, because a large radius of curvature more resembles a linear movement and which is beneficial for simple actuation control. On the other hand, a small $D_{L-R}$ is beneficial for a compact lens-shift OIS module, i.e. a lens-shift OIS module having a small $W_M$. In addition, first OIS frame 362 is linearly moved in the x-y plane as indicated by arrow 374.

Figure 3B:
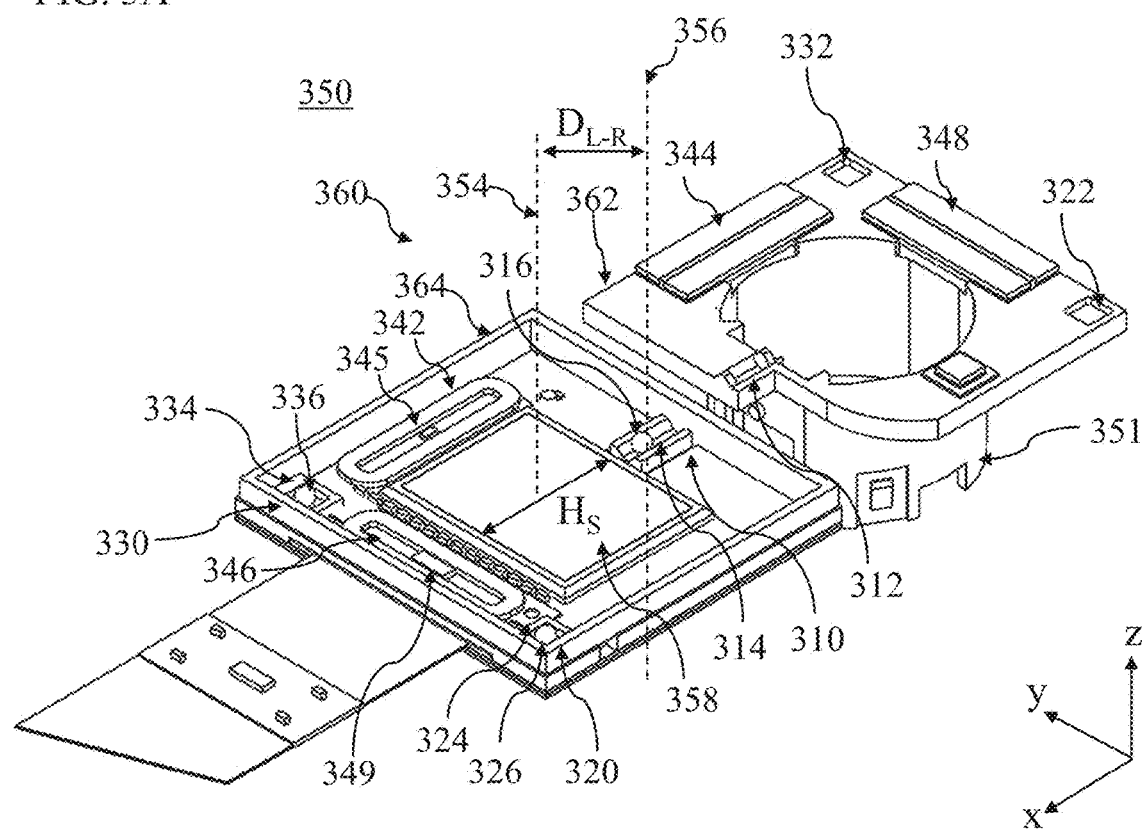
FIG. 3B shows parts of the camera module of FIG. 3A in another perspective view.
Figure 3C:
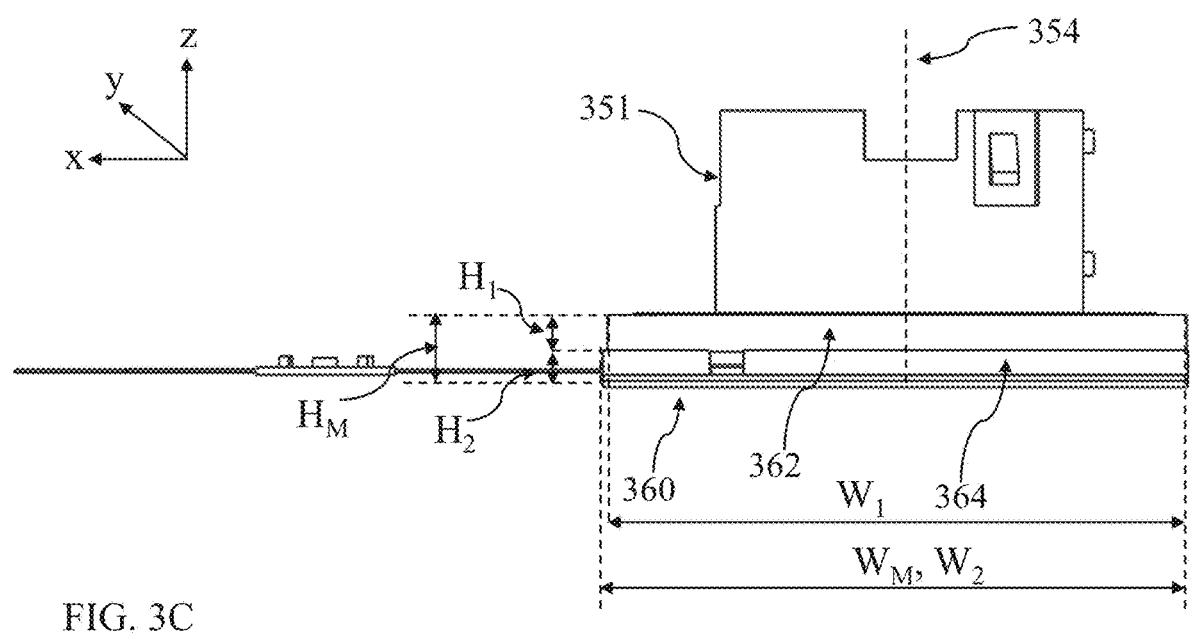
FIG. 3C shows parts of the camera module of FIGS. 3A-B in a side view.

FIG. 3B shows parts of camera module 350 of FIG. 3A in another perspective view. FIG. 3C shows parts of camera module 350 of FIGS. 3A-B in a side view. Camera module 350 includes an image sensor 358, a linear pin-groove mechanism 310 ("first ball-bearing"), a first pin-pool mechanism 320 ("second ball-bearing") and a second pin-pool mechanism 330 ("third ball-bearing") for performing the rotational OIS motion and the linear OIS motion described above and as indicated by arc 372 and by arrow 374 respectively. Included in a mobile device, lens-shift OIS module 360 provides OIS along two directions, i.e. it corrects for hand-shake around two rotation axes. Specifically, lens-shift OIS module 360 corrects for hand-shake around the two rotation axes which are perpendicular to a normal of image sensor 358, or in other words, perpendicular to lens optical axis 354. This is valid for all lens-shift OIS modules disclosed herein. The OIS is provided by moving two frames relative to each other, wherein the relative movement is a rotational movement and a linear movement.

Linear pin-groove mechanism 310 includes a first groove 312 that is included in first OIS frame 362, a second groove 314 that is included in second OIS frame 364, and a ball of a ball-bearing (or "bearing ball" or simply "ball") 316. First OIS VCM includes a coil 346, a magnet 348 and a position sensor 349 (e.g. a magnetic flux measuring device ("MFMD") such as a Hall sensor) and actuates the linear motion of first OIS frame 362 relative to second OIS frame 364. Magnet 348 is fixedly coupled to first OIS frame 362. Coil 346 and position sensor 349 are fixedly coupled to second OIS frame 364. The linear motion is transmitted via linear pin-groove mechanism 310, i.e. by ball 316 which is enclosed in a rail formed by first groove 312 and second groove 314. First pin-pool mechanism 320 includes a first pool 322 (or "recess" or "notch") that is included in first OIS frame 362, a second pool 324 that is included in second OIS frame 364 and a ball 326. Second pin-pool mechanism 330 includes a first pool 332 that is included in first OIS frame 332, a second pool 334 that is included in second OIS frame 364, and a ball 336. Second OIS VCM includes a coil 342, a magnet 344 and a position sensor 345 (e.g. a Hall sensor) and actuates the rotational motion of first OIS frame 362 around rotation axis 356 relative to second OIS frame 364. Magnet 344 is fixedly coupled to first OIS frame 362. Coil 342 and position sensor 345 are fixedly coupled to second OIS frame 364. The rotational motion is transmitted via first pin-pool mechanism 320 and second pin-pool mechanism 330, i.e. ball 326 and ball 336 which are enclosed in a volume (or space) formed by first pool 322 and second pool 324 and first pool 332 and second pool 334 respectively. Rotation axis 356 coincides with the position of ball 316, i.e. ball 316 forms a pivot point for rotation.

In lens-shift OIS module 360 and with respect to the y-axis, the pivot point is located at a center position of image sensor 358. The center position defines a symmetry axis of image sensor 358. In other embodiments and with respect to the y-axis, linear pin-groove mechanism 310 (and the pivot point) may be located at another location. That is, the pivot point may not be located at a symmetry axis of image sensor 358. In other embodiments, springs as known in the art instead of the ball-bearings may transmit and direct the OIS motion.

Figure 4A:
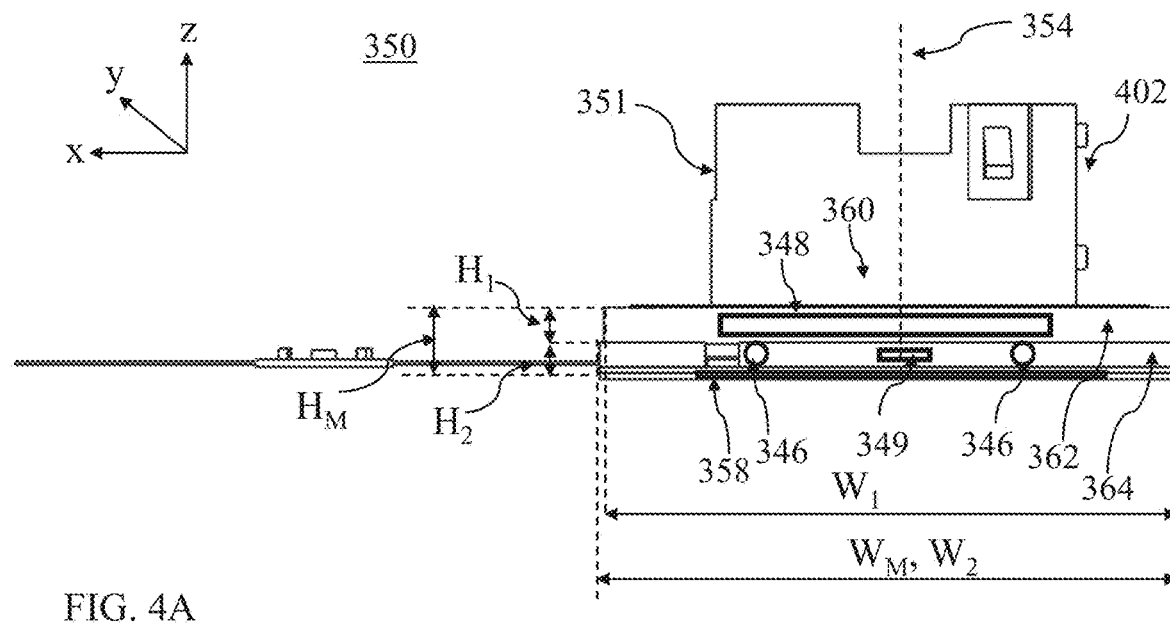
FIG. 4A shows parts of the camera module of FIGS. 3A-B in another side view.

FIG. 4A shows parts of camera module 350 of FIGS. 3A-C in another side view. All components and dimensions are identical to the parts of a camera module 350 shown in FIG. 3C. In particular, the parts of a camera module 350 include lens-shift OIS module 360 as described above. First OIS VCM including coil 346, magnet 348 and position sensor 349 are visible. A VCM actuator for focusing a lens ("focus actuator") included in lens carrier 351 may include a coil, a position sensor and a magnet. The coil and the position sensor of the focus actuator may be fixedly coupled to lens carrier 351, a position (or location) of the coil and the position sensor is marked 402. In particular, this means that there is an electrical connection between a mobile device including the parts of a camera module 350 and lens carrier 351. The electrical connection is operational to supply power and control signals (and receive position signals) to the coil and to the position sensor of the focus actuator.

Figure 4B:
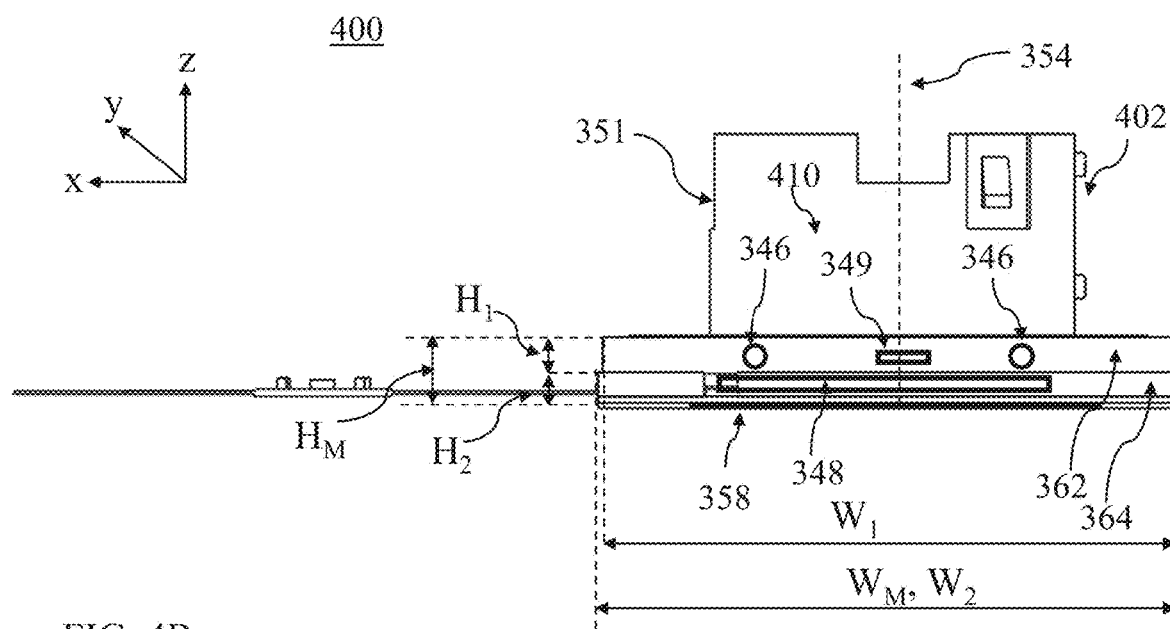
FIG. 4B shows parts of another camera module disclosed herein in the same side view as shown in FIG. 4A.

FIG. 4B shows parts of another embodiment of a camera module numbered 400 disclosed herein in the same side view as shown in FIG. 4A. Camera module 400 may be identical with camera module 350 in terms of functionality and dimensions. All components included in the parts of camera module 400 as well as the dimensions ($W_1$, $W_M$, $W_2$ etc.) of the parts of camera module 400 respectively are identical to the components included in the parts of camera module 350 as well as the dimensions of the parts of camera module 350 respectively. However, the parts of camera module 400 include another lens-shift OIS module 410. Lens-shift OIS module 410 differs from lens-shift OIS module 360 (see FIG. 4A) by the location (or position) of components included in the respective OIS actuator. The OIS actuator in lens-shift OIS module 410 includes a third VCM and a fourth VCM. All components of the first and second OIS VCMs in lens-shift OIS module 360 are also included in the third and fourth OIS VCMs of lens-shift OIS module 410. However, the inclusion of the components is inverse: all components of the first OIS VCM and the second OIS VCM respectively included in second OIS frame 364 in the third OIS VCM and the fourth OIS VCM respectively, are here included in first OIS frame 362 and vice versa. Explicitly, this means that magnet 348 is fixedly coupled to second OIS frame 364, and coil 346 and position sensor 349 are fixedly coupled to first OIS frame 362, as shown. Magnet 344 is fixedly coupled to second OIS frame 364, and coil 342 and position sensor 345 are fixedly coupled to first OIS frame 362 (not shown). In camera module 350, magnet 348 is farther from image sensor 358 than position sensor 349. In camera module 400, magnet 348 is closer to image sensor 358 than position sensor 349.

In some examples, an electrical connection to coil 342 and position sensor 345 as well as to coil 346 and position sensor 349 may be provided by the very same electrical connection between a mobile device including camera module 400 and lens carrier 351 (which is fixedly coupled to second OIS frame 364) as described above.

For controlled motion, a VCM performs position sensing as well as actuation. Some advantages of lens-shift OIS module 410 over lens-shift OIS module 360 may include (1) a simpler position sensing, (2) a simpler actuation control, and/or (3) a faster actuation, as detailed below. It is noted that magnet 344 and magnet 348 respectively are used both for OIS actuation (due to interaction with coil 342 and coil 346 respectively) and for position sensing (due to interaction with position sensor 345 and position sensor 349 respectively), whereas position sensor 345 and position sensor 349 are used for position sensing only.

(1) Simpler Position Sensing

A symmetry axis for position sensing is defined by a relative orientation between magnet 344 and image sensor 358 and between magnet 348 and image sensor 358 respectively. When performing OIS with lens-shift OIS module 360, both magnet 344 and magnet 348 move rotationally with respect to image sensor 358. This means that a symmetry axis for position sensing rotates with respect to image sensor 358. When performing OIS with lens-shift OIS module 410, both magnet 344 and magnet 348 do not move with respect to image sensor 358. This means that a symmetry axis for position sensing does not rotate with respect to image sensor 358, which is beneficial for sensing OIS movements.

(2) Simpler Actuation Control

A symmetry axis of magnet 344 and magnet 348 respectively determines a direction of the respective VCM's actuation force. When performing OIS with lens-shift OIS module 410, both magnet 344 and magnet 348 do not move with respect to image sensor 358. This means that a direction of the VCM's actuation force does not rotate with respect to image sensor 358, which is beneficial for controlling OIS actuation.

(3) Faster Actuation

In lens-shift OIS module 410, magnet 344 and magnet 348 respectively do not move with respect to image sensor 358, i.e. magnet 344 and magnet 348 respectively are not actuated for performing OIS. In other words, magnet 344 and magnet 348 are not included in the "moving mass" of OIS module 410. In general, a magnet makes up a relatively large share (or portion) of a weight of a VCM. This means that compared to lens-shift OIS module 360, lens-shift OIS module 410, has a relatively small moving mass, what is beneficial in terms of fast (or low-power) actuation.

Figure 5A:
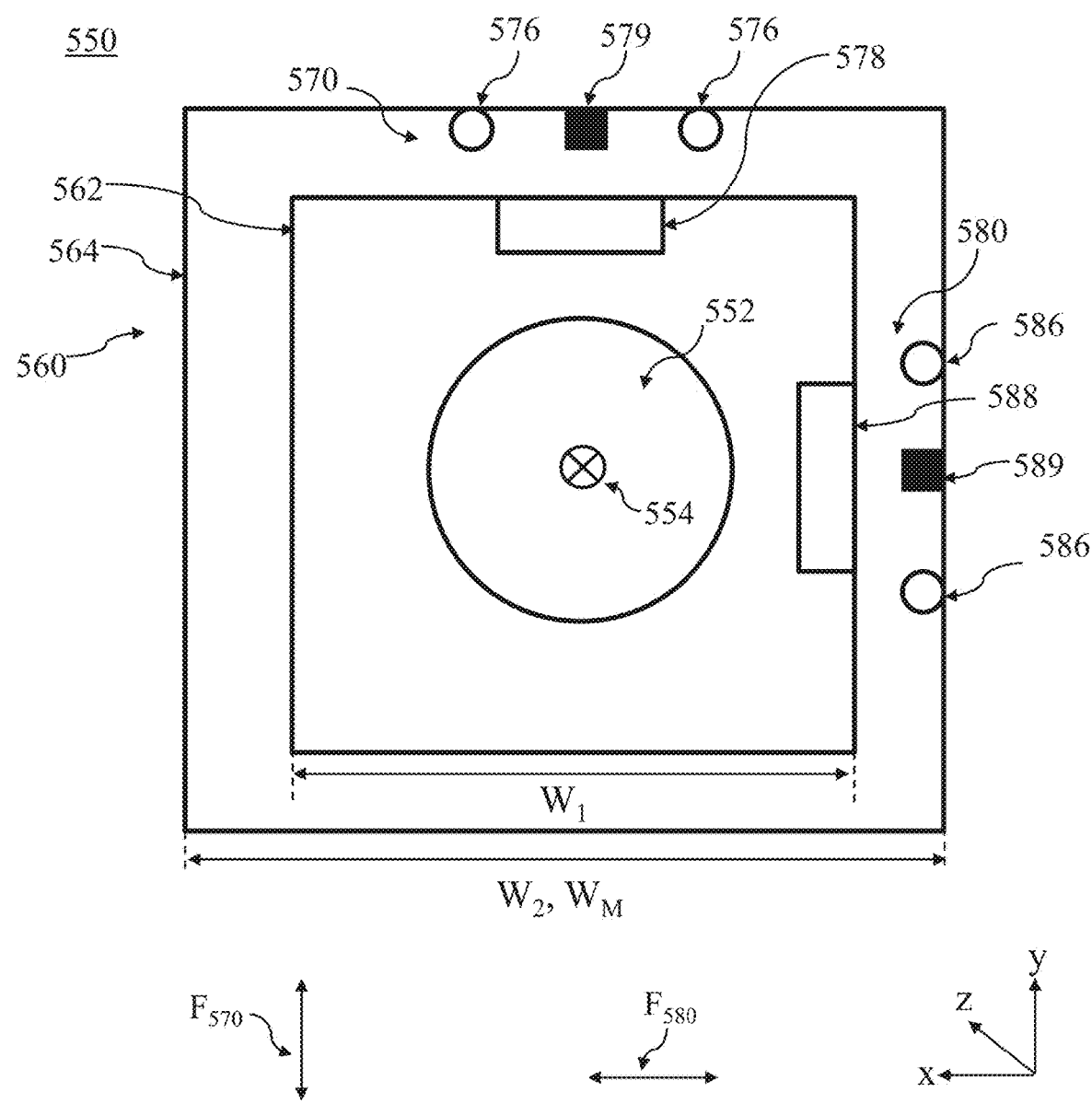
FIG. 5A shows schematically a camera including a lens and another lens-shift OIS module as disclosed herein in a top view.

FIG. 5A shows schematically an embodiment of another camera module numbered 550 that includes a lens 552 having a lens optical axis 554 and a lens-shift OIS module 560 as disclosed herein. Lens-shift OIS module 560 includes a first OIS frame 562 having a first OIS frame width $W_1$ and a second OIS frame 564 having a second OIS frame width $W_2$. OIS module width $W_M$ is determined by second OIS frame 564, i.e. $W_M=W_2$. All details of the movement of first OIS frame 562 and second OIS frame 564 as well as lens 552 are identical as described above for OIS module 260, OIS module 360, etc.

Camera module 550 may be identical with camera module 350 and camera module 400 in terms of functionality and dimensions. Lens-shift OIS module 560 may be identical with lens-shift OIS module 360 or it may be identical with lens-shift OIS module 410 in terms of OIS functionality and dimensions, except that lens-shift OIS module 560 includes a different OIS actuator. The OIS actuators included in lens-shift OIS module 360 and in lens-shift OIS module 410 are characterized by the fact that during an operation of a VCM included in the OIS actuator, a distance between a coil (or a position sensor such as a magnetic flux measuring device ("MFMD") included in the VCM and a magnet included in the VCM does not change. In other words, a first plane oriented parallel to the coil and a second plane oriented parallel to the magnet's movement are parallel to each other and, in addition, a distance between the first plane and the second plane does not change. In the following, we refer to these VCMs as "regular VCM". The OIS actuators included in lens-shift OIS module 360 and in lens-shift OIS module 410 are regular VCMs. In contrast, lens-shift OIS module 560's OIS actuator includes a different type of VCM, which we refer to as "push-pull VCM". Specifically, lens-shift OIS module 560 includes a first push-pull VCM 570 and a second push-pull VCM 580. A direction of a force that is exercised (or generated) by first push-pull VCM 570 and second push-pull VCM 580 respectively is indicated by arrow $F_{570}$ (parallel to the y-axis) and $F_{580}$ (parallel to the x-axis) respectively. A force of first push-pull VCM 570 and second push-pull VCM 580 respectively is transmitted into an OIS movement as detailed above, e.g. based on ball-bearings. First push-pull VCM 570 includes a coil 576, a magnet 578 and a position sensor 579. Second push-pull VCM 580 includes a coil 586, a magnet 588 and a position sensor 589. As shown, magnet 578 and magnet 588 are fixedly coupled to first OIS frame 562. First OIS frame 562 is a moving frame. Coil 576 and position sensor 579 as well as coil 576 and position sensor 579 are fixedly coupled to second OIS frame 564. Second OIS frame 562 is a static frame.

Figure 5B:
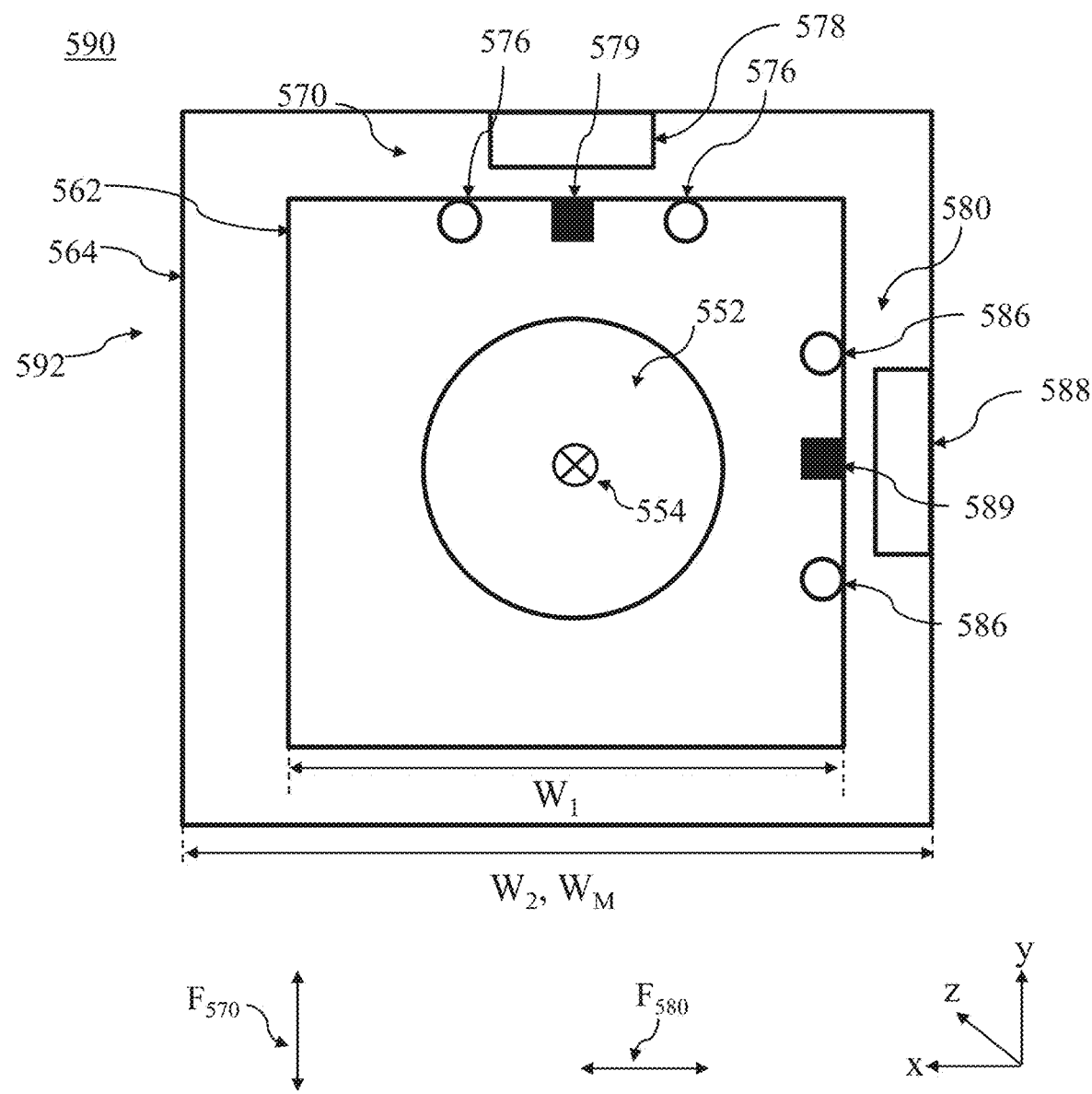
FIG. 5B shows schematically a camera including a lens and a yet another lens-shift OIS module as disclosed herein in a top view.

FIG. 5B shows schematically an embodiment of another camera module numbered 590 that includes a lens-shift OIS module 592 as disclosed herein. Camera module 590 may be identical with camera module 350, camera module 400 and camera module 55 in terms of functionality and dimensions. The OIS actuator of lens-shift OIS module 592 includes a third push-pull VCM and a fourth push-pull VCM. All components of lens-shift OIS module 560's first push-pull VCM and second push-pull VCM are included in lens-shift OIS module 592's third push-pull VCM and fourth push-pull VCM as well. However, the inclusion of the components is inverse: in camera module 590, magnet 578 and magnet 588 are fixedly coupled to second OIS frame 564, and coil 576 and position sensor 579 as well as coil 576 and position sensor 579 are fixedly coupled to first OIS frame 562. The advantages of such an embodiment are identical to advantages of lens-shift OIS module 410 over lens-shift OIS module 360 as discussed above.

For the sake of clarity, the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

It is to be noted that the various features described in the various embodiments can be combined according to all possible technical combinations.

It is to be understood that the disclosure is not limited in its application to the details set forth in the description contained herein or illustrated in the drawings. The disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the disclosure as hereinbefore described without departing from its scope, defined in and by the appended claims.

What is claimed is:

1. An optical image stabilization (OIS) mechanism, comprising:
   a moving frame including a first groove;
   a static frame including a second groove;
   an OIS actuator; and
   first, second and third ball-bearings defining an OIS plane and positioned between the moving frame and the static frame to allow a first movement and a second movement of the moving frame relative to the static frame,
   wherein the first ball bearing is located in a rail formed by the first groove and the second groove,
   wherein the first movement is a rotational movement of the moving frame around a rotation axis that coincides with the position of the first ball bearing and is perpendicular to the OIS plane, and
   wherein the second movement is a linear movement of the moving frame along the rail.

2. The OIS mechanism of claim 1, wherein the moving frame includes a first pool and a third pool, wherein the static frame includes a second pool and a fourth pool, wherein the second ball bearing is located in a volume formed by the first pool the second pool, and wherein the third ball bearing is located in a volume formed by the third pool and the fourth pool.

3. The OIS mechanism of claim 1, wherein the OIS mechanism is operational to provide OIS along two OIS directions.

4. The OIS mechanism of claim 1, wherein the OIS actuator is a regular voice coil motor (VCM).

5. The OIS mechanism of claim 4, wherein the regular VCM includes at least one magnet fixedly coupled to the static frame.

6. The OIS mechanism of claim 4, wherein the regular VCM includes at least one magnet fixedly coupled to the moving frame.

7. The OIS mechanism of claim 1, wherein the OIS actuator is a push-pull voice coil motor (VCM).

8. The OIS mechanism of claim 7, wherein the push-pull VCM includes at least one magnet fixedly coupled to the static frame.

9. The OIS mechanism of claim 7, wherein the push-pull VCM includes at least one magnet fixedly coupled to the moving frame.

10. The OIS mechanism of claim 1, wherein the OIS mechanism is operational to provide OIS in an OIS range of less than 2 mm in the direction of the first movement and less than 2 mm in the direction of the second movement.

11. The OIS mechanism of claim 1, wherein the moving frame has a moving frame height $H_{MF}$ and the static frame has a static frame height $H_{SF}$, wherein $H_{MF}$ is in the range of 0.25 mm to 1.5 mm and wherein $H_{SF}$ is in the range of 0.25 mm to 1.5 mm.

12. The OIS mechanism of claim 1, wherein the moving frame has a moving frame width $W_{MF}$ and the static frame has a static frame width $W_{SF}$, wherein $W_{MF}$ is in the range of 10 mm to 40 mm and wherein $W_{SF}$ is in the range of 10 mm to 40 mm.

13. The OIS mechanism of claim 1, wherein the OIS mechanism is included in an OIS module that has an OIS module height $H_M$ in the range of 0.5 mm to 5 mm.

14. The OIS mechanism of claim 1, wherein the OIS mechanism is included in an OIS module that has an OIS module width $W_M$ in the range of 10 mm to 40 mm.

15. The OIS mechanism of claim 1, included in a digital camera that comprises a lens, and wherein the lens moves together with the moving frame for the OIS.

16. The OIS mechanism of claim 15, wherein the lens moves relative to the moving frame for focusing.

17. The OIS mechanism of claim 15, wherein the digital camera includes an image sensor and wherein the position of the first ball bearing is located at a center position of the image sensor.

18. The OIS mechanism of claim 15, wherein the digital camera is a pop-out camera.

19. The OIS mechanism of claim 15, wherein the digital camera is included in a smartphone.

* * * * *